United States Patent
Sprehe et al.

(10) Patent No.: US 9,453,081 B2
(45) Date of Patent: Sep. 27, 2016

(54) PROCESS OF PREPARING AN ESTER OF A CELLULOSE ETHER

(71) Applicant: Dow Global Technologies LLC, Midland, TX (US)

(72) Inventors: Matthias Sprehe, Walsrode (DE); Oliver Petermann, Hamburg (DE); Robert B. Appell, Midland, MI (US)

(73) Assignee: DOW GLOBAL TECHNOLOGIES LLC

( * ) Notice: Subject to any disclaimer, the term of this patent is extended or adjusted under 35 U.S.C. 154(b) by 0 days.

(21) Appl. No.: 14/384,220

(22) PCT Filed: Mar. 12, 2013

(86) PCT No.: PCT/US2013/030394
§ 371 (c)(1),
(2) Date: Sep. 10, 2014

(87) PCT Pub. No.: WO2013/148154
PCT Pub. Date: Oct. 3, 2013

(65) Prior Publication Data
US 2015/0031873 A1 Jan. 29, 2015

Related U.S. Application Data

(60) Provisional application No. 61/616,207, filed on Mar. 27, 2012.

(51) Int. Cl.
| | | |
|---|---|---|
| *C08B 3/00* | (2006.01) | |
| *C08B 3/12* | (2006.01) | |
| *C08B 3/28* | (2006.01) | |
| *C08B 13/00* | (2006.01) | |
| *C08B 11/20* | (2006.01) | |

(52) U.S. Cl.
CPC .............. *C08B 13/00* (2013.01); *C08B 11/20* (2013.01)

(58) Field of Classification Search
CPC ............. C08B 3/00; C08B 3/12; C08B 3/28; C08B 13/00
USPC .................................................. 536/66, 124
See application file for complete search history.

(56) References Cited

U.S. PATENT DOCUMENTS

| | | | |
|---|---|---|---|
| 2,852,508 A | 9/1958 | Hiatt et al. | |
| 3,435,027 A | 3/1969 | Desmarais et al. | |
| 3,525,735 A | 8/1970 | Miller | |
| 4,226,981 A | 10/1980 | Onda et al. | |
| 4,365,060 A | 12/1982 | Onda et al. | |
| 5,236,713 A * | 8/1993 | Wato ...................... | A61K 9/006 424/443 |
| 2004/0152886 A1 | 8/2004 | Cho et al. | |
| 2011/0091360 A1 | 4/2011 | Hassan et al. | |

FOREIGN PATENT DOCUMENTS

| | | |
|---|---|---|
| CN | 101225115 | 7/2008 |
| CN | 102199221 | 12/2014 |
| EP | 0219426 A2 | 4/1987 |
| EP | 2295470 A1 | 3/2011 |
| JP | 05339301 A * | 12/1993 |
| WO | 9738016 A1 | 10/1997 |
| WO | 02085949 A1 | 10/2002 |
| WO | 2005115330 A2 | 12/2005 |

OTHER PUBLICATIONS

Raymond Chen, Characterization of Hypromellose Acetate Succinate by Size Exclusion Chromatography (SEC) Using Viscotek Triple Detector, Int. Journal of Polymer Anal. Charact., 2009, 14, p. 617-630.
Hiroyasu Kokubo et al., Development of Cellulose Derivatives as Novel Enteric Coating Agents Soluble at pH 3.5-4.5 and Higher, Chem. Pharm. Bull., 1997, vol. 45, No. 8, p. 1350-1353.

* cited by examiner

*Primary Examiner* — Patrick Lewis
*Assistant Examiner* — Everett White

(57) ABSTRACT

A reaction product mixture is obtained from a reaction of (a) a cellulose ether with (b) an aliphatic monocarboxylic acid anhydride or with a di- or tricarboxylic acid anhydride or with a combination of an aliphatic monocarboxylic acid anhydride and a di- or tricarboxylic acid anhydride in the presence of (c) an aliphatic carboxylic acid. A process for precipitating an esterified cellulose ether from this reaction product mixture comprises the step of contacting the reaction product mixture with water and subjecting the combination of water and the reaction product mixture to a shear rate of at least 800 $s^{-1}$. The precipitated esterified cellulose ether can be recovered as a non-tacky product.

15 Claims, 9 Drawing Sheets

PROCESS OF PREPARING AN ESTER OF A CELLULOSE ETHER

FIELD

The present invention relates to an improved process for recovering an ester of a cellulose ether from a reaction product mixture.

INTRODUCTION

Esters of cellulose ethers, their uses and processes for preparing them are generally known in the art. One process for producing cellulose ether-esters is described in U.S. Pat. No. 3,435,027.

Hydroxypropyl methyl cellulose acetate succinate (HPMCAS), hydroxypropyl methyl cellulose acetate (HPMCA) and hydroxypropyl methyl cellulose phthalate (HPMCP) are useful in pharmaceutical dosage forms. HPMCAS is useful as an enteric polymer for pharmaceutical dosage forms. Enteric polymers are those that remain intact in the acidic environment of the stomach. Dosage forms coated with such polymers protect the drug from inactivation or degradation in the acidic environment or prevent irritation of the stomach by the drug.

In a conventional method of preparing esters of cellulose ethers, such as HPMCAS, HPMCA or HPMCP, cold water is poured to the reaction product mixture in order to initiate the precipitation of the product and to dilute and remove the impurities. However, applying this method, HPMCAS and HPMCA in the form of a fine powder or granules cannot be obtained because inter-particle coagulation occurs to a very large extent. The inter-particle coagulation prevents water from penetrating between the particles, so that it becomes difficult to effectively remove impurities like acetic acid, sodium acetate, succinic acid, phthalic acid, unreacted hydroxypropyl methyl cellulose (HPMC) and others. Moreover, additional milling or crushing of the product is required to obtain a granular product.

U.S. Pat. No. 4,226,981 discloses a process for preparing mixed esters of cellulose ethers, such as HPMCAS, by esterifying hydroxypropyl methyl cellulose with succinic anhydride and acetic anhydride in the presence of an alkali carboxylate, such as sodium acetate, as the esterification catalyst and acetic acid as the reaction medium. After completion of the esterification reaction, a large volume of water, specifically 10 times by volume of water, is added to the reaction product mixture so that the reaction product is precipitated. The precipitated product is then subjected to a thorough washing with water to remove impurities and dried to produce a mixed ester in the powdery or granular form.

International Patent Application WO 2005/115330 discloses HPMCAS and HPMCA polymers with a specific combination of substitution levels. HPMCAS and HPMCA polymers are useful for forming solid amorphous dispersions of hydrophobic drugs. The polymers allow high amounts of drug in the dispersion and still remain homogeneous upon storage, while providing enhanced concentrations of the dissolved drug in a use environment. HPMCAS and HPMCA are produced in a similar manner as described in U.S. Pat. No. 4,226,981. Once the reaction is complete, a large volume of water is added to the reaction product mixture so that HPMCAS or HPMCA is precipitated. In one of the working examples 10 g of hydroxypropyl methylcellulose (HPMC) is reacted with 1.2 g of succinic anhydride and 41.4 g of acetic anhydride in 100 mL of glacial acetic acid in the presence of 10.1 g of sodium acetate; the reaction product mixture comprising the HPMCAS is quenched with 700 mL of water to precipitate the HPMCAS. In the other working example 5 g of HPMC is reacted with 1.53 g of acetic anhydride in 50 mL (51.3 g) of glacial acid in the presence of 5.07 g of sodium acetate; the reaction product mixture comprising the HPMCA is quenched with 800 mL of water saturated with sodium chloride to precipitate the HPMCA. The precipitated product is then subjected to thorough washing with water to remove impurities.

European Patent Application EP 0 219 426 discloses a process for producing HPMCP or HPMCAS wherein 100 parts by weight of HPMC, 80 parts by weight of sodium acetate and 300 parts by weight of acetic acid are either reacted with 120 parts by weight of phthalic anhydride or a combination of 25 parts by weight of succinic anhydride and 38 parts by weight of acetic anhydride. Thereafter, 1200 parts by weight of water are added to the reaction product mixture and the precipitate formed in the mixture is collected by filtration and repeatedly washed with water until the washing precipitate is no longer acidic. Unfortunately, esters of cellulose ethers, such as HPMCAS, HPMCA and HPMCP tend to exhibit a very tacky nature in the presence of an aliphatic carboxylic acid, such as acetic acid, and an alkali metal carboxylate, such as sodium acetate. Even the use of large amounts of water for precipitating the HPMCAS, HPMCA or HPMCP from the reaction product mixture does not necessarily solve the problem of the tacky nature of these polymers. Often lumps or hard solids of HPMCAS, HPMCA or HPMCP are generated which are difficult to handle during the subsequent washing and drying procedure. After the drying procedure often a coarse solid product of the polymers is obtained which is somewhat hard and clotted and exhibits lumps. As a result crushing of final product becomes very difficult.

US Patent Application Publication No. US 2004/0152886 addresses the need of preventing coagulation of HPMCP particles so that impurities like phthalic acid and acetic acid present between the particles can contact with water and be washed away. US 2004/0152886 suggests increasing the fluidity of the reaction product mixture by adding a fluidization solvent as a post-treatment process, and spraying it into water through a spray nozzle. Unfortunately, this purification process is quite complex due to the required spray nozzle and the need for high pressure pumps to enable reliable spraying. The reaction product mixture has a high tendency to cause clogging of the spray nozzles.

Accordingly, an object of the present invention is to provide a process for preparing an ester of a cellulose ether in which substantial coagulation of the particles of the esterified cellulose ether after precipitation can be prevented without the need of spraying the reaction product mixture through spray nozzles.

Another object of the present invention is to provide a process for preparing an ester of a cellulose ether in which substantial coagulation of the particles of the esterified cellulose ether during the washing of the esterified cellulose ether can be prevented to improve its washability.

Yet another object of the present invention is to provide a process for preparing an ester of a cellulose ether by which a non-tacky finely powdered ester of a cellulose ether can be obtained without the need of spraying the reaction product mixture through spray nozzles.

SUMMARY

Surprisingly, it has been found that i) substantial coagulation of the particles of the esterified cellulose ether during or after precipitation can be prevented, ii) substantial coagulation of the particles of the esterified cellulose ether during the washing of the esterified cellulose ether can be prevented whereby its washability is improved and iii) a non-tacky finely powdered ester of a cellulose ether can be obtained, when a reaction product mixture comprising the esterified cellulose ether is contacted with water and the combination of water and the reaction product mixture is subjected to a shear rate of at least 800 s$^{-1}$.

Accordingly, one aspect of the present invention is a process for precipitating an esterified cellulose ether from a reaction product mixture obtained from a reaction of (a) a cellulose ether with (b) an aliphatic monocarboxylic acid anhydride or with a di- or tricarboxylic acid anhydride or with a combination of an aliphatic monocarboxylic acid anhydride and a di- or tricarboxylic acid anhydride in the presence of (c) an aliphatic carboxylic acid, wherein the process comprises the step of contacting the reaction product mixture with water and subjecting the combination of water and the reaction product mixture to a shear rate of at least 800 s$^{-1}$.

Another aspect of the present invention is a process of preparing an ester of a cellulose ether wherein (a) a cellulose ether is reacted with (b) an aliphatic monocarboxylic acid anhydride or with a di- or tricarboxylic acid anhydride or with a combination of an aliphatic monocarboxylic acid anhydride and a di- or tricarboxylic acid anhydride in the presence of (c) an aliphatic carboxylic acid and the esterified cellulose ether is precipitated from the reaction product mixture in a process which comprises the step of contacting the reaction product mixture with water and subjecting the combination of water and the reaction product mixture to a shear rate of at least 800 s$^{-1}$.

DETAILED DESCRIPTION (DESCRIPTION OF EMBODIMENTS)

Figure 1A:
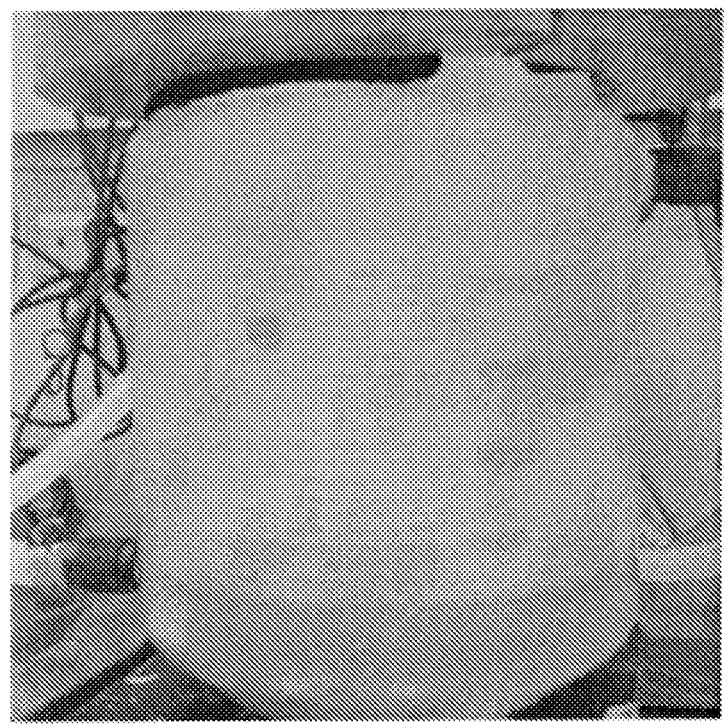
FIG. 1A illustrates precipitation of HPMCAS from a first reaction mixture as described in Example 1, obtained by reacting HPMC with succinic anhydride and acetic anhydride in the presence of glacial acetic acid and sodium acetate, by contacting the reaction mixture with water according to a first comparative process applying a low shear rate. The HPMCAS precipitate formed sticky lumps.

According to the process of the present invention an esterified cellulose ether is precipitated as described further below from a reaction product mixture that has been obtained from a reaction of (a) a cellulose ether with (b) an aliphatic monocarboxylic acid anhydride or with a di- or tricarboxylic acid anhydride or with a combination of an aliphatic monocarboxylic acid anhydride and a di- or tricarboxylic acid anhydride in the presence of (c) an aliphatic carboxylic acid and optionally (d) an alkali metal carboxylate.

The cellulose ether (a) used as a starting material for the esterification reaction preferably is an alkyl cellulose, hydroxyalkyl cellulose or hydroxyalkyl alkylcellulose. The hydroxyalkoxy groups are typically hydroxymethoxy, hydroxyethoxy and/or hydroxypropoxy groups. Hydroxyethoxy and/or hydroxypropoxy groups are preferred. Preferably a single kind of hydroxyalkoxy group, more preferably hydroxypropoxy, is present in the cellulose ether. The alkoxy groups are typically methoxy, ethoxy and/or propoxy groups. Methoxy groups are preferred. Illustrative of the above-defined cellulose ethers are methylcellulose, ethylcellulose, and propylcellulose; hydroxyethylcellulose, hydroxypropylcellulose, hydroxyethyl methylcellulose, ethyl hydroxyethylcellulose, hydroxymethyl ethylcellulose, hydroxypropyl methylcellulose, hydroxypropyl ethylcellulose, hydroxybutyl methylcellulose, and hydroxybutyl ethylcellulose. More preferably, the cellulose ether is a hydroxypropyl methylcellulose.

The cellulose ether used as a starting material in the process of the present invention preferably has a viscosity of from 2.4 to 200 mPa·s, preferably from 2 to 100 mPa·s, more preferably from 2.5 to 50 mPa·s, in particular from 3 to 30 mPa·s, measured as a 2 weight-% aqueous solution at 20° C. according to ASTM D2363-79 (Reapproved 2006).

The average number of hydroxyl groups substituted by alkoxy groups, such as methoxy groups, per anhydroglucose unit, is designated as the degree of substitution of alkoxy groups (DS). In the above-given definition of DS, the term "hydroxyl groups substituted by alkoxy groups" does not only include alkylated hydroxyl groups directly bound to the carbon atoms of the cellulose backbone, but also alkylated hydroxyl groups of hydroxyalkoxy substituents bound to the cellulose backbone. Most preferably, the cellulose ether is a hydroxypropyl methylcellulose with a $DS_{methoxyl}$ of from 1.1 to 2.1, more preferably 1.75 to 2.05 and an $MS_{hydroxypropoxyl}$ of from 0.05 to 1.1, more preferably from 0.15 to 0.4. The $DS_{methoxyl}$ and $MS_{hydroxypropoxyl}$ are determined according to United States Pharmacopeia and National Formulary, Hypromellose (hydroxproyl methyl cellulose).

The cellulose ether (a) is reacted with (b) an aliphatic monocarboxylic acid anhydride or with a di- or tricarboxylic acid anhydride or with a combination of an aliphatic monocarboxylic acid anhydride and a di- or tricarboxylic acid anhydride. Preferred aliphatic monocarboxylic acid anhydrides are selected from the group consisting of acetic anhydride, butyric anhydride and propionic anhydride. Preferred dicarboxylic acid anhydrides are selected from the group consisting of succinic anhydride, maleic anhydride and phthalic anhydride. A preferred tricarboxylic acid anhydride is trimellitic anhydride. A preferred aliphatic monocarboxylic acid anhydride can be used alone; or a preferred di- or tricarboxylic acid anhydride can be used alone; or a preferred aliphatic monocarboxylic acid anhydride can be used in combination with a preferred di- or tricarboxylic acid anhydride.

The production of the following esterified cellulose ethers from the above-mentioned cellulose ethers, aliphatic monocarboxylic acid anhydrides and di- or tricarboxylic acid anhydrides is particularly preferred:

i) HPMC-XY and HPMC-X, wherein HPMC is hydroxypropyl methyl cellulose, X is A (acetate), or X is B (butyrate) or X is Pr (propionate) and Y is S (succinate), Y is P (phthalate), Y is M (maleate) or Y is T (trimellitate), such as hydroxypropyl methyl cellulose acetate phthalate (HPMCAP), hydroxypropyl methyl cellulose acetate trimellitate (HPMCAT), hydroxypropyl methyl cellulose acetate maleate (HPMCAM) or hydroxypropyl methylcellulose acetate succinate (HPMCAS); or ii) hydroxypropyl methyl cellulose phthalate (HPMCP); hydroxypropyl cellulose acetate succinate (HPCAS), hydroxybutyl methyl cellulose propionate succinate (HBMCPrS), hydroxyethyl hydroxypropyl cellulose propionate succinate (HEHPCPrS); and methyl cellulose acetate succinate (MCAS).

Hydroxypropyl methylcellulose acetate succinate (HPMCAS) is the most preferred esterified cellulose ether.

The esterification of the cellulose ether can be conducted in a known manner, for example as described in U.S. Pat. Nos. 3,435,027 and 4,226,981, in the International Patent Application WO 2005/115330, or in European Patent Application EP 0 219 426. The esterification of the cellulose ether is conducted in (c) an aliphatic carboxylic acid as a reaction medium, such as acetic acid, propionic acid, or butyric acid. The reaction medium can comprise minor amounts of other solvents or diluents which are liquid at room temperature and do not react with the cellulose ether, such as halogenated $C_1$-$C_3$ derivatives, such as dichloro methane, or dichloro methyl ether, but the amount of the aliphatic carboxylic acid should generally be more than 50 percent, preferably at least 75 percent, and more preferably at least 90 percent, based on the total weight of the reaction medium. Most preferably the reaction medium consists of an aliphatic carboxylic acid. The esterification reaction is generally conducted in the presence of 100 to 2,000 parts by weight of an aliphatic carboxylic acid as the reaction medium per 100 parts by weight of the cellulose ether.

The esterification reaction is generally conducted in the presence of (d) an esterification catalyst, preferably in the presence of an alkali metal carboxylate, such as sodium acetate or potassium acetate. The amount of the alkali metal carboxylate is preferably 20 to 200 parts by weight of the alkali metal carboxylate per 100 parts by weight of the cellulose ether. If an aliphatic monocarboxylic acid anhydride and a di- or tricarboxylic acid anhydride are used for esterifying the cellulose ether, the two anhydrides may be introduced into the reaction vessel at the same time or separately one after the other. The amount of each anhydride to be introduced into the reaction vessel is determined depending on the desired degree of esterification to be obtained in the final product, usually being 1 to 10 times the stoichiometric amounts of the desired molar degree of substitution of the anhydroglucose units by esterification. The mixture is generally heated at 60° C. to 110° C., preferably at 70 to 100° C., for a period of time sufficient to complete the reaction, that is, typically from 2 to 25 hours, more typically from 2 to 8 hours. The cellulose ether as the starting material is not always soluble in the aliphatic carboxylic acid, but can only be dispersed in or swollen by the aliphatic carboxylic acid, especially when the degree of substitution in the cellulose ether is relatively small. The esterification reaction can take place even with such a dispersed or swollen cellulose ether and, as the esterification reaction proceeds, the cellulose ether under reaction generally dissolves in the reaction medium, to finally give a homogeneous solution.

The resulting reaction product mixture comprises the esterified cellulose ether, an aliphatic carboxylic acid used as a reaction medium, typically a reaction catalyst, such as an alkali metal carboxylate, typically residual amounts of one or more esterification agents and by-products, such as an aliphatic monocarboxylic acid and/or a di- or tricarboxylic acid. The resulting reaction product mixture generally comprises from 3 to 60 weight percent of the esterified cellulose ether, from 20 to 90 weight percent of an aliphatic carboxylic acid, from 5 to 50 weight percent of a reaction catalyst, such as an alkali metal carboxylate, and from 0.1 to 30 weight percent of minor components, such as non-reacted anhydrides of an aliphatic monocarboxylic acid and/or of a di- or tricarboxylic acid.

In the process of the present invention the above-described reaction product mixture is contacted with water and the combination of water and the reaction product mixture is subjected to a shear rate of at least 800 s$^{-1}$, preferably at least 1500 s$^{-1}$, more preferably at least 3000 s$^{-1}$, most preferably at least 8000 s$^{-1}$. The shear rate is generally up to 600,000 s$^{-1}$, and typically up to 500,000 s$^{-1}$, more typically up to 100,000 s$^{-1}$ and most typically up to 50,000 s$^{-1}$. Applying such shear rates in the process of the present invention is useful for providing esters of cellulose ethers which are non-tacky and of fine particle size upon precipitation and separation from the reaction product mixture.

The above-mentioned shear rate can be obtained in a high shear device, such as a high shear mixer, also known as rotor-stator mixer or homogenizer, high shear mill or high shear pump. A high shear device commonly comprises a rotor in combination with a stationary part of the shear device, also referred to as "stationary", such as a stator or housing. The stationary creates a close-clearance gap between the rotor and itself and forms a high-shear zone for materials in this gap. The stationary can include single or multiple rows of openings, gaps or teeth to induce a kind of shear frequency and increased turbulent energy.

One metric for the degree or thoroughness of mixing is the shearing force generated by a mixing device with a high tip speed. Fluid undergoes shear when one area of fluid travels with a different velocity relative to an adjacent area. The tip speed of the rotor is a measure of the kinetic energy generated by the rotation according to the formula:

Tip speed=rotation rate of rotor×rotor circumference.

The shear rate is based on the inverse relationship between the gap distance between the rotor and the stationary part of the shear device which is commonly referred to as the stator or housing In the case the high shear device is not equipped with a stator, the inner wall of a precipitation vessel serves as a stator.

Shear rate=Tip speed/gap distance between outer diameter of rotor and stationary.

The process of the present invention is preferably conducted in a shear device running at a tip speed of at least 4 m/s, preferably at least 8 m/s, and more preferably at least 15 m/s. The tip speed is generally up to 320 m/s, typically up to 280 m/s, and more typically up to 30 m/s.

A further shearing is induced by a velocity difference between the tip velocity of the fluid at the outside diameter of the rotor and the velocity at the centre of the rotor.

High shear devices are also called high shear mixers and encompass different geometries such as colloid mills, toothed-devices, axial-discharge and radial-discharge rotor stator mixers (Atiemo-Obeng, V. A. and Calabrese, R. V., 2004. "Rotor-stator mixing devices" in Handbook of Industrial Mixing: Science and Practice, E. L. Paul, V. A. Atiemo-Obeng and S. M. Kresta, John Wiley & Sons, Hoboken, N.J., USA.). The high shear device can be used in a continuous or batch operation.

Water and the above described reaction product mixture comprising the esterified cellulose ether and the aliphatic carboxylic acid can be fed as separate fluid streams or as a combined fluid stream to the high shear device. The reaction product mixture comprising the esterified cellulose ether and the aliphatic carboxylic acid generally has a temperature of from 60° C. to 110° C. It can be contacted with the water without previous cooling of the reaction product mixture. The temperature of the water preferably is from 1 to 90° C., more preferably from 5 to 40° C.

Preferably the reaction product mixture is contacted with an amount of from 5 to 400, more preferably from 8 to 300, most preferably from 10 to 100, and particularly from 12 to 50 weight parts of water per weight part of cellulose ether used for esterification.

The weight ratio [water/aliphatic carboxylic acid] is generally up to 300/1, preferably up to 200/1, more preferably up to 100/1 and most preferably up to 30/1. Generally the weight ratio [water/aliphatic carboxylic acid] is at least 3/1, typically at least 6/1, more typically at least 10/1.

The weight ratio [water/reaction product mixture excluding water] is generally up to 10/1.0, preferably up to 5.0/1.0, more preferably up to 3.0/1.0. The weight ratio [water/reaction product mixture excluding water] is generally at least 1.0/1.0, preferably at least 1.4/1.0, more preferably at least 2.0/1.0. Alternatively, the preferred amount of water utilized in the precipitation process of the present invention can be expressed as the weight ratio [water/starting materials used for producing the esterified cellulose ether], specifically the weight ratio [water/(total weight of (a) cellulose ether, (b) aliphatic monocarboxylic acid anhydride and di- or tricarboxylic acid anhydride, (c) aliphatic carboxylic acid, and (d) esterification catalyst)]. This weight ratio preferably is from [1.0/1.0] to [10.0/1.0], more preferably from [1.4/1.0] to [5.0/1.0], most preferably from [2.0/1.0] to [3.0/1.0].

Figure 7A:
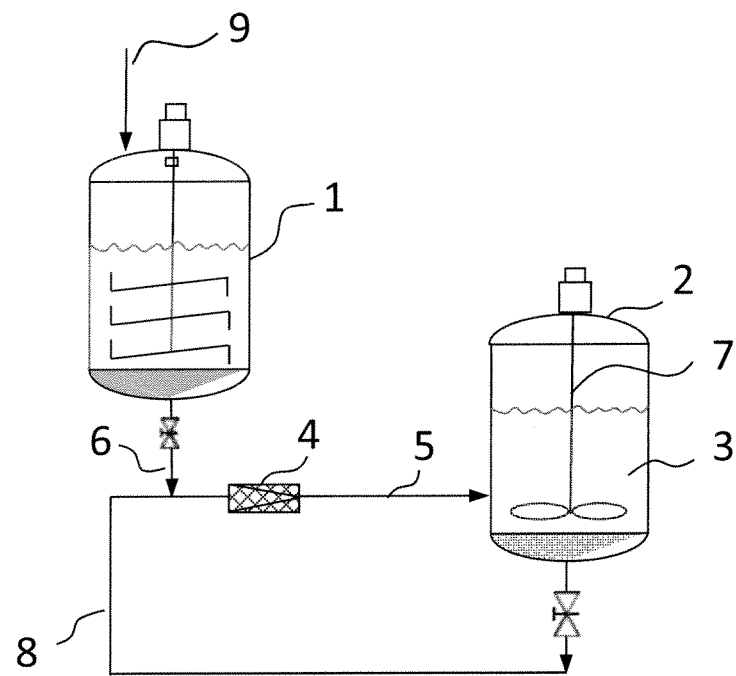
FIGS. 7A, 7B, 7C and 7D illustrate flow charts of embodiments of the process of the present invention.

FIG. 7A represents a flowchart of a preferred embodiment of the precipitation process of the present invention, but the precipitation process of the present invention is not limited to it. The reactants (a) a cellulose ether, (b) an aliphatic monocarboxylic acid anhydride, a di- or tricarboxylic acid anhydride or a combination thereof, (c) an aliphatic carboxylic acid, and typically (d) an esterification catalyst, preferably an alkali metal carboxylate, are fed in combination or separately into a reaction vessel (1) via an inlet conduit (9). A separate precipitation vessel (2) is loaded with water (3). The precipitation vessel (2) is equipped with a central agitator (7) and recirculation loop (8) with an installed high-shear device (4). Water is circulated through the recirculation loop (8) and fed back into the precipitation vessel (2) via an outlet conduit (5) of the high-shear device (4). For precipitation of the esterified cellulose ether, the reaction product mixture is fed from the reaction vessel (1) through a transfer pipe (6) into the continuous water flow circulating in the recirculation loop (8). The combination of the reaction product mixture and water is subjected to high shear in the high shear device (4) and passed from there to the precipitation vessel (2) via an outlet conduit (5) of the high-shear device (4). After the total reaction product mixture has been transferred into the precipitation vessel (2), optionally an additional amount of water is added to the precipitation vessel, preferably while agitating the contents of the precipitation vessel using the central agitator (7). The precipitated suspension is recirculated in the recirculation loop (8) by use of the high-shear device (4).

Preferably the high-shear device (4) utilized in the process illustrated in FIG. 7A is a in-line high-shear device. In an inline high-shear device, generally a mixing head is contained in a housing driven through a seal with an inlet at one end and an outlet at the other end or on the circumference of the device. The esterified cellulose ether and water are preferably drawn through the mixing head in a continuous stream. Equilibrium mixing is typically achieved by passing the combination of water and the reaction product mixture comprising the esterified cellulose ether through the inline high-shear device more than once. Known vendors for high shear devices such as rotor-stator mixers, high shear mills or high shear pumps are Herbst Maschinenfabrik GmbH, Germany (model series HI), Charles Ross & Son Company, USA (model series 400DL, 100LCI, 100, HSD, 700), IKA GmbH & Co. KG, Germany (model series Ultra-Turrax, UTL, DR, MK, colloid mills MK), Scott Turbon Mixer Inc., USA (models series L-HSM, HSM, IL, HSP, Scott top, bottom and floor mounted mixers), FrymaKoruma AG, Switzerland (model series DIL), and BWS Technology, Germany (?) (model series Supraton and Reflector). An example of a useful high shear device is disclosed in U.S. patent application 2011/0091360.

The suspension is removed from the precipitation vessel (2) via an outlet pipe (not shown) and the dispersed ester of the cellulose ether can subsequently be separated from the remainder of the mixture in a known manner, such as by centrifugation or filtration or upon settling by decantation. The recovered ester of the cellulose ether can be washed with water to remove impurities and dried to produce a esterified cellulose ether in the form of a powder.

Figure 7B:
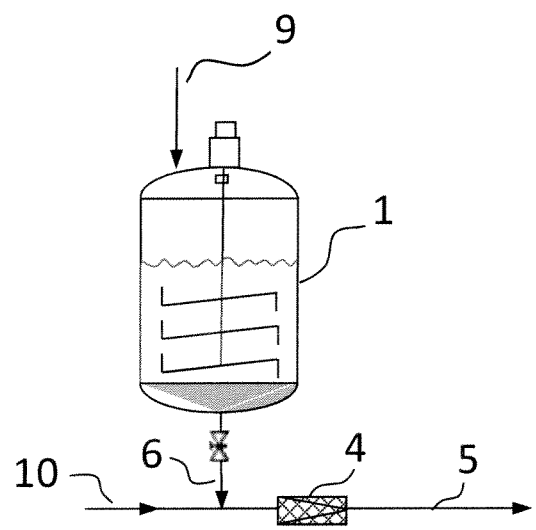

FIG. 7B illustrates a modification of the precipitation process illustrated in FIG. 7A. Like in the precipitation process illustrated in FIG. 7A, the reactants (a) a cellulose ether, (b) an aliphatic monocarboxylic acid anhydride, a di- or tricarboxylic acid anhydride or a combination thereof, (c) an aliphatic carboxylic acid, and typically (d) an esterification catalyst, preferably an alkali metal carboxylate, are fed in combination or separately into a reaction vessel (1) via an inlet conduit (9). For precipitation of the esterified cellulose ether, the reaction product mixture is fed from the reaction vessel (1) through a transfer pipe (6) into a high-shear device (4). Water is not recycled from a precipitation vessel, but is continuously fed through a water conduit 10 into the high-shear device (4). The combined stream of water and reaction product mixture is fed into a precipitation vessel (not shown) via an outlet conduit (5) of the high-shear device (4).

Figure 7C:
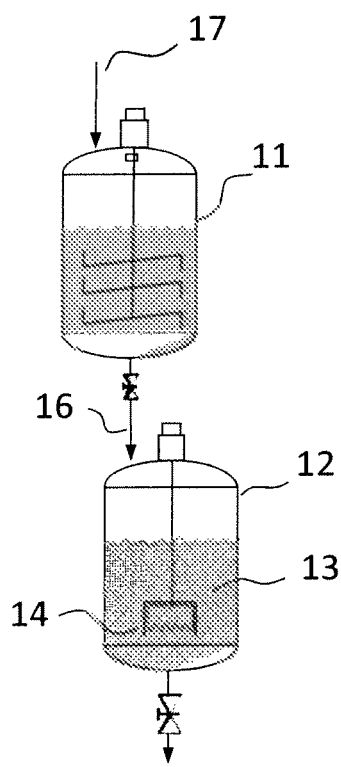

FIG. 7C represents a flowchart of another embodiment of the precipitation process of the present invention. The reactants (a) a cellulose ether, (b) an aliphatic monocarboxylic acid anhydride, a di- or tricarboxylic acid anhydride or a combination thereof, (c) an aliphatic carboxylic acid, and typically (d) an esterification catalyst, preferably an alkali metal carboxylate, are fed in combination or separately into a reaction vessel (11) via an inlet conduit (17) and from there through a transfer pipe (16) into a separate precipitation vessel (12) that has been loaded with water (13) and that is equipped with a high shear device (14), preferably with a high-shear mixer on a rotating shaft. The suspension can be removed from the precipitation vessel (12) and further processed as described with reference to FIG. 7A.

Figure 7D:
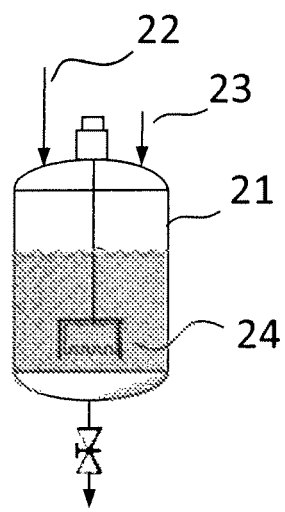

FIG. 7D represents a flowchart of yet another embodiment of the precipitation process of the present invention. The reactants (a) a cellulose ether, (b) an aliphatic monocarboxylic acid anhydride, a di- or tricarboxylic acid anhydride or a combination thereof, (c) an aliphatic carboxylic acid, and typically (d) an esterification catalyst, preferably an alkali metal carboxylate, are fed in combination or separately into a reaction vessel (21) via an inlet conduit (22). The reaction vessel (21) is equipped with a high shear device (24), preferably with a high-shear mixer on a rotating shaft. During the esterification reaction the shear rate of the reaction mixture is not critical. In one embodiment of the invention the shear rate during the esterification reaction is less than 800 $s^{-1}$ and the shear rate is increased to at least 800 $s^{-1}$ for precipitation of the esterified cellulose ether. In another embodiment of the invention the shear rate is already 800 $s^{-1}$ or more during the esterification reaction. After completion of the esterification reaction, water is fed into the reaction vessel (21) via a water inlet conduit (23) and the high shear device (24) is set to run at a speed to provide a shear rate of at least 800 $s^{-1}$.

Some embodiments of the invention will now be described in detail in the following Examples.

EXAMPLES

Unless otherwise mentioned, all parts and percentages are by weight.

Example 1

Production of a Reaction Product Mixture Comprising Hydroxypropyl Methyl Cellulose Acetate Succinate (HPMCAS)

250.0 g of glacial acetic acid, 60.0 g of acetic anhydride, 51.67 g (dry content 96.82%) of a hydroxypropyl methylcellulose (HPMC), 20.0 g of succinic anhydride and 50.0 g of sodium acetate (water free) were introduced into a glass reactor with an inner diameter of 147 mm and intensively mixed by use of a MIG™ stirrer (two blade axial flow impeller, company EKATO, Schopfheim, Germany) with a outer diameter of 120 mm. The HPMC had a viscosity of about 3.1 mPa·s, measured as a 2% aqueous solution at 20° C., a degree of methoxyl substitution, DS(methoxyl), of 1.92, and a hydroxypropoxyl substitution, MS(hydroxypropoxyl), of 0.26, measured according to the United States Pharmacopeia and National Formulary, Hypromellose (hydroxproyl methyl cellulose).

The mixture was heated at 85° C. and intensively mixed by agitation for 3 hours to effect esterification. The reaction was carried out as described in Example 1, Sample No. 4 of U.S. Pat. No. 4,226,981.

Precipitation of HPMCAS According to a Comparative Process

The precipitation was carried out as described in Example 1, Sample No. 4 of U.S. Pat. No. 4,226,981. After esterification, about 10 times by volume of distilled water was added within 3 minutes to the hot reaction product mixture to allow the reaction product to be precipitated. During the addition of the water the content of the glass reactor was stirred by use of the above described MIG™ stirrer (outer blades diameter 120 mm) running at 150 rpm and a tip speed of 0.9 m/s. The resulting shear rate was 35 $s^{-1}$.

Figure 1B:
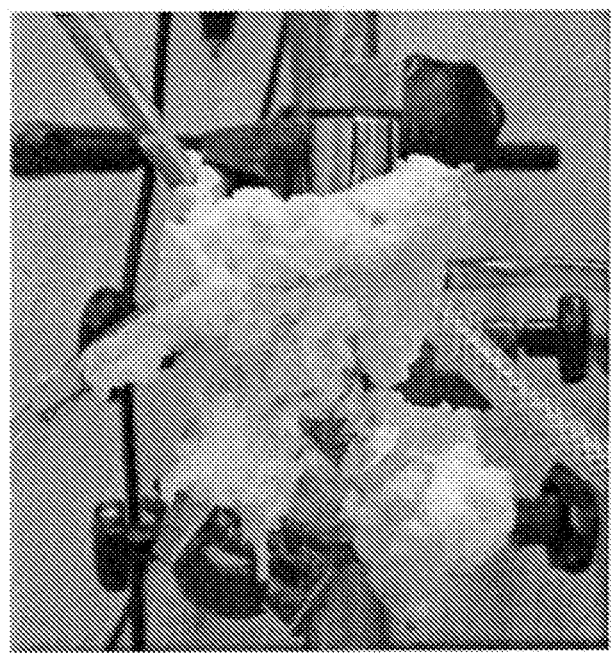
FIG. 1B illustrates the tacky HPMCAS sticking at the stirrer blades obtained according to the first comparative process after precipitation.

The HPMCAS precipitate formed sticky lumps as shown in FIG. 1A. Stirring was continued for about 3 minutes without significant changes in the appearance of the precipitate. After stirring was terminated, lumps of HPMCAS continued to stick to the stirrer (FIG. 1B).

Figure 1C:
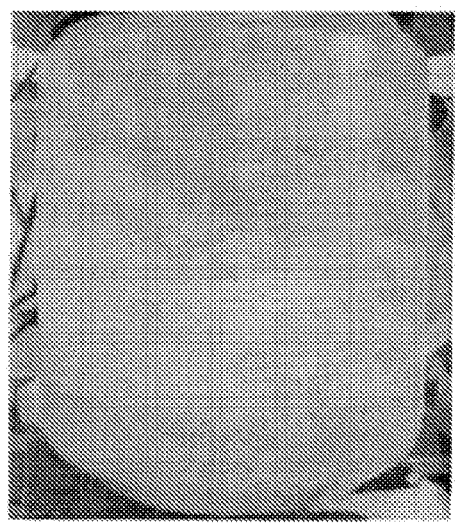
FIG. 1C illustrates the HPMCAS product after re-suspension in water applying a low shear rate. The HPMCAS still formed sticky lumps.
Figure 1D:
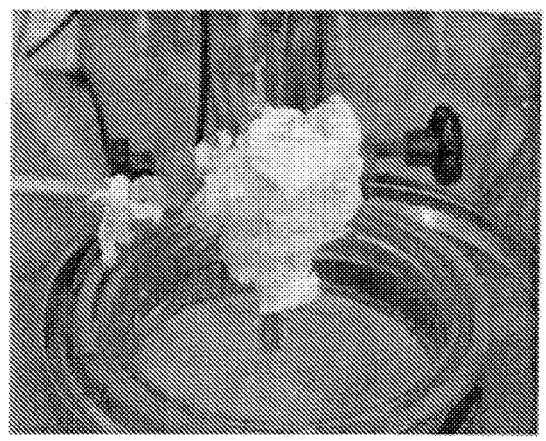
FIG. 1D illustrates the tacky HPMCAS sticking at the stirrer blades obtained even after removal of the first amount of water utilized for precipitation and re-suspension in water applying a low shear rate.
Figure 1E:
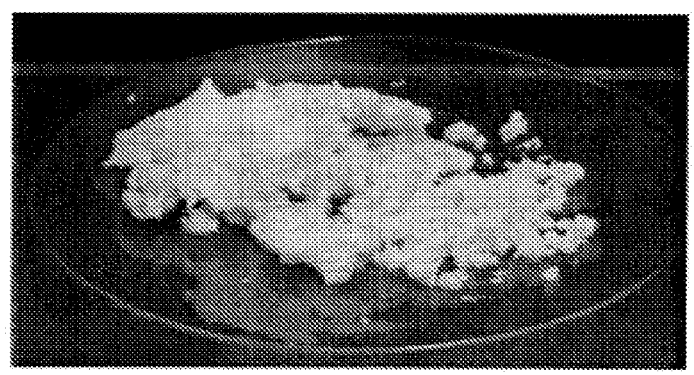
FIG. 1E illustrates the tacky HPMCAS obtained according to the first comparative process after re-suspension in water and separation from water.

Even after displacement of the amount of water that had been used for precipitation by separation and re-suspension in 3.7 L of water while stirring at 150 rpm by use of the above described MIG™ stirrer a tacky product was obtained (FIG. 1C) that stuck to the stirrer as shown in FIG. 1D. After separation and isolation of the re-suspended product from water, very tacky lumps of HPMCAS were isolated, as shown in FIG. 1E. Drying at 50-55° C. did not change the tacky appearance.

Precipitation of HPMCAS According to the Present Invention

The hot reaction product mixture of Example 1 was continuously added over a time period of 3 minutes into a 5 Liter beaker glass with a diameter of 170 mm which was filled with distilled water with about 10 times by volume of the transferred reaction product mixture. During the addition of the hot reaction product mixture the content of the beaker glass was stirred using an Ultra-Turrax stirrer S50-G45 (rotor diameter 36 mm, inner stator diameter 38 mm) running at 5200 rpm and a tip speed of 9.8 m/s. The resulting shear rate was 9800 s$^{-1}$.

Figure 2A:
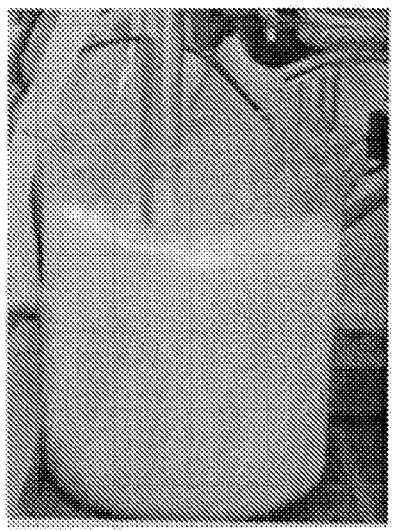
FIG. 2A illustrates precipitation of HPMCAS from the same reaction mixture as described in Example 1 by transferring the reaction mixture into water according to the process of the invention at high shear rate. The HPMCAS formed a finely dispersed precipitate.

The HPMCAS formed a finely dispersed precipitate as shown in FIG. 2A. After displacement of the water, which had been utilized for precipitation, by separation and re-suspension in 3.7 L of water the product suspension was again stirred using the Ultra-Turrax stirrer S50-G45 running at 5200 rpm and a tip speed of 9.8 m/s. The resulting shear rate was 9800 s$^{-1}$.

Figure 2B:
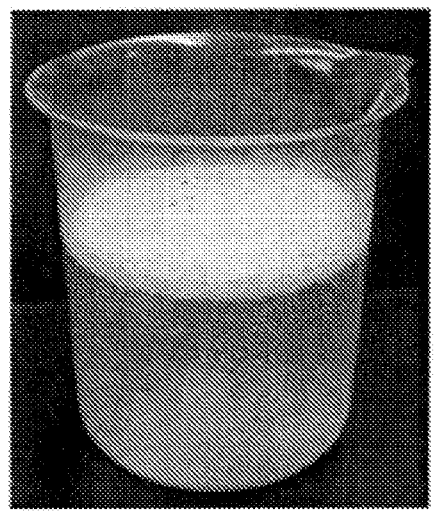
FIG. 2B illustrates the HPMCAS product after re-suspension in water applying a high shear rate. After stirring was terminated, a fine precipitate of HPMCAS was formed.
Figure 2C:
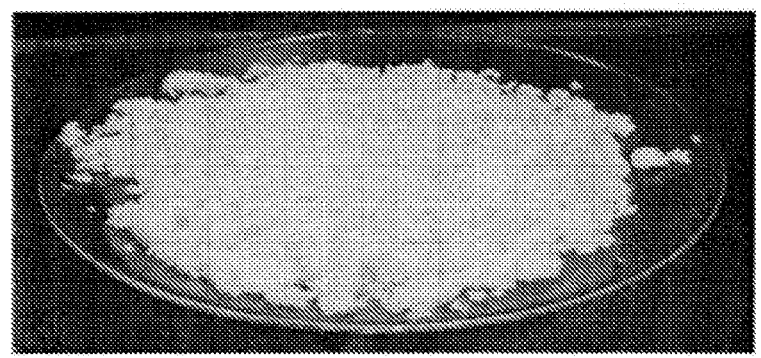
FIG. 2C illustrates the granular non-sticking HPMCAS filter cake obtained according to the process of the invention after re-suspension in water and separation from water.

After stirring was terminated, a fine precipitate of HPMCAS was formed as shown in FIG. 2B which didn't show a tacky behavior. After separation and isolation of the re-suspended product from water a white granular non-sticking HPMCAS filter cake was obtained as shown in FIG. 2C which showed a good flowability and could be dispersed in water as fine particles without the formation of tacky lumps. The HPMCAS was dried at 50-55° C. for 10 hours to obtain a non-tacky product of fine particle size.

Example 2

Production of a Reaction Product Mixture Comprising HPMCAS 314.7 g of glacial acetic acid was introduced into a glass reactor equipped with a MIG™ stirrer and placed into an oil bath set at 85° C. 31.1 g of the same HPMC as in Example 1 and 30.32 g of sodium acetate (water free) were added and allowed to dissolve. Once complete dissolution of the HPMC occurred, 3.55 g of succinic anhydride was added and allowed to react for 2.5 hours 124.09 g of acetic anhydride was added and allowed to react for an additional 21 hours. The reaction was carried out as described in the International Patent Application WO 2005/115330, page 51 where the synthesis of HPMCAS polymers is generally described.

Precipitation of HPMCAS According to a Comparative Process

The hot reaction product mixture of Example 2 was continuously added over a time period of 3 minutes into a 5 Liter beaker glass with a diameter of 170 mm which was filled with 2.1 L of distilled water. During the addition of the hot reaction product mixture the content of the beaker glass was stirred using the same MIG™ stirrer as described in Example 1 by running at 150 rpm and a tip speed of 0.9 m/s. The resulting shear rate was 19 s$^{-1}$.

Figure 3A:
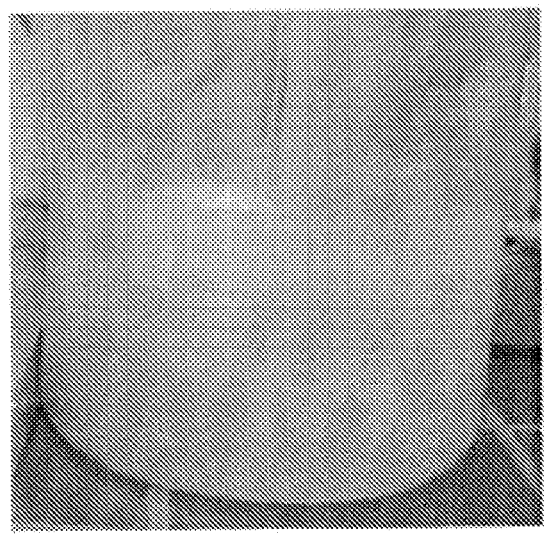
FIG. 3A illustrates precipitation of HPMCAS from a second reaction mixture as described in Example 2, obtained by reacting HPMC with succinic anhydride and acetic anhydride in the presence of glacial acetic acid and sodium acetate, by contacting the reaction mixture with water according to a second comparative process applying a low shear rate. One sticky chunk of HPMCAS was formed sticking to the stirrer.

After stirring was terminated after about 3 minutes one sticky chunk of HPMCAS was formed sticking to the stirrer, as shown in FIG. 3A.

Figure 3B:
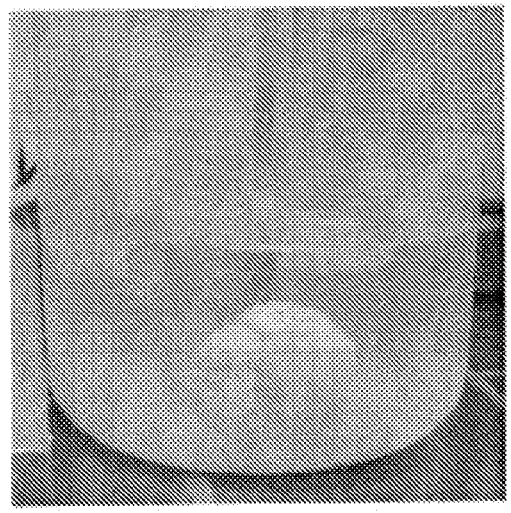
FIG. 3B illustrates the HPMCAS product after re-suspension in water applying a low shear rate. The HPMCAS formed one sticky chunk.

Even after displacement of the amount of water that had been used for precipitation by separation and re-suspension in 2.1 L of water while stirring at 150 rpm by use of the above described MIG™ stirrer a tacky product was obtained that stuck to the stirrer. After displacement of the water, which had been utilized for precipitation, by separation and re-suspension in 2.1 L of water by using the MIG™ stirrer, the tackiness and appearance of the sticky mass did not change, as shown in FIG. 3B.

Figure 3C:
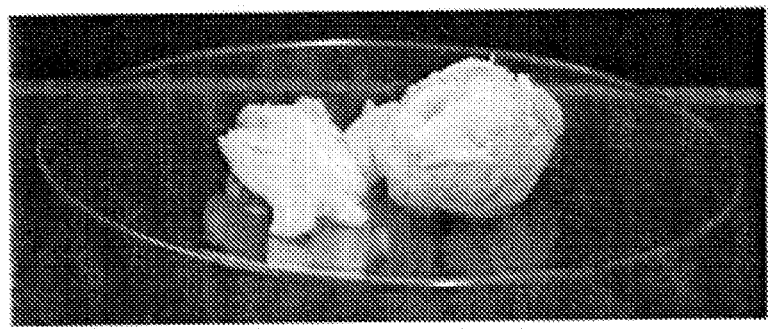
FIG. 3C illustrates the tacky chunk of HPMCAS obtained according to the second comparative process after re-suspension in water and separation from water.

After separation and isolation of the product from water tacky chunks of product were obtained, as shown in FIG. 3C, which could not be easily dispersed in water. Drying at 50-55° C. did not change the tacky appearance.

Precipitation of HPMCAS According to the Present Invention

Figure 4A:
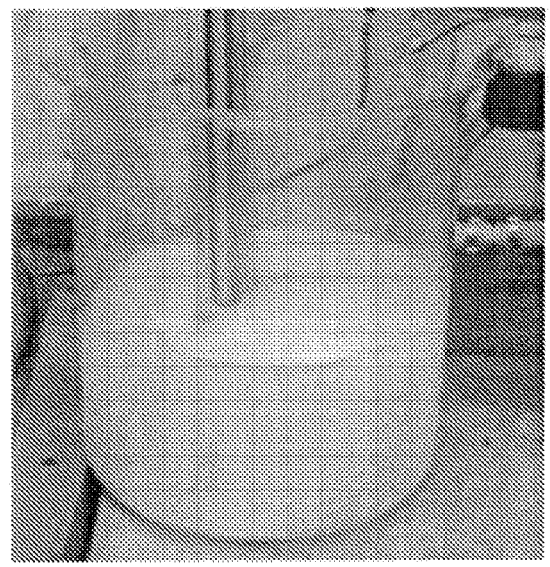
FIG. 4A illustrates precipitation of HPMCAS from the same reaction mixture as described in Example 2 by transferring the reaction mixture into water according to the process of the invention at high shear rate. The HPMCAS formed a finely dispersed precipitate.

The hot reaction product mixture of Example 2 was continuously added over a time period of 3 minutes into a 5 Liter beaker glass with a diameter of 170 mm which was filled with 2.1 L of distilled water. During the addition of the hot reaction product mixture the content of the beaker glass was stirred using the same Ultra-Turrax device as described in Example 1 by running at 5200 rpm and a tip speed of 9.8 m/s. The resulting shear rate was 9800 s$^{-1}$. The HPMCAS formed a finely dispersed precipitate as shown in FIG. 4A.

After displacement of the water that had been used for precipitation by separation and re-suspension in 2.1 L of water the product suspension was again stirred using the Ultra-Turrax stirrer S50-G45 running at 5200 rpm and a tip speed of 9.8 m/s. The resulting shear rate was 9800 s−1.

Figure 4B:
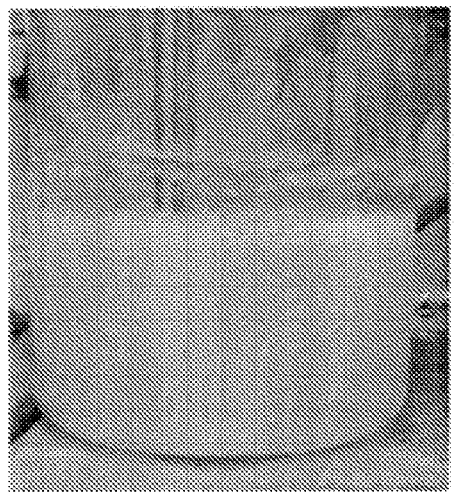
FIG. 4B illustrates the HPMCAS product after re-suspension in water applying a high shear rate. After stirring was terminated, a fine precipitate of HPMCAS was formed.

After stirring was terminated, a fine precipitate of HPMCAS was formed as shown in FIG. 4B which did not show a tacky behavior.

Figure 4C:
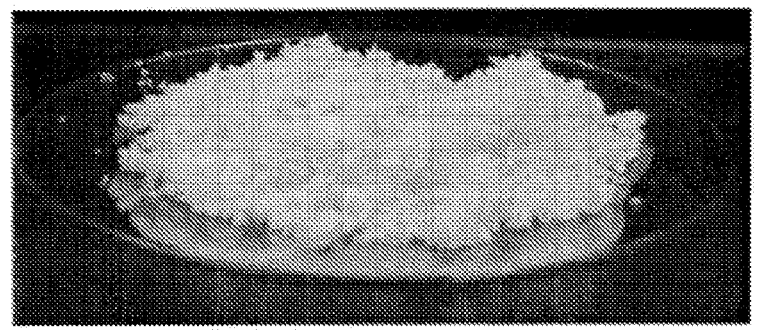
FIG. 4C illustrates the granular non-sticking HPMCAS filter cake obtained according to the process of the invention after re-suspension in water and separation from water.

After separation and isolation of the re-suspended product from water a white granular non-sticking HPMCAS filter cake was obtained as shown in FIG. 4C which showed a good flowability and could be dispersed in water as fine particles without the formation of tacky lumps. The HPMCAS was dried at 50-55° C. for 10 hours to obtain a non-tacky product of fine particle size.

Example 3

Production of a Reaction Product Mixture Comprising HPMCAS 123 kg of glacial acetic acid, 32 kg of acetic anhydride, 23.4 kg (dry content 97.5%) of the same HPMC as in Example 1.7 kg of succinic anhydride and 25 kg of sodium acetate (water free) were introduced into a 400 L horizontal plough share mixer and intensively mixed by use of the plough shares and an installed chopper (not shown). The mixture was heated to 85° C. and intensively mixed by agitation for 3.5 hours at 85° C. to effect esterification.

Precipitation of HPMCAS According to the Present Invention

The production of the reaction product mixture and the precipitation process were carried out as illustrated by FIG. 7A. Glacial acetic acid, acetic anhydride, HPMC, succinic anhydride and sodium acetate were fed into a reaction vessel (1) via an inlet conduit (9) as described above. A separate precipitation vessel (2) with a volume of 1 m$^3$ was loaded with 500 L of water (3). The precipitation vessel (2) was equipped with a central agitator (7) and recirculation loop (8) with an installed high-shear device (4). The central agitator (7) was stirring at a rotational speed of about 75 rpm (corresponding to a tip speed of 2.4 m/s). The high-shear device (4) was operated at 2900 rpm and a tip speed of 14.9 m/s. This resulted in a shear rate of about 30,000 s$^{-1}$. Water was circulated through the recirculation loop (8) and fed back into the precipitation vessel (2) via an outlet (5) of the high-shear device (4) at a recirculation flow rate of about 15-20 m$^3$/h.

For precipitation of the HPMCAS product, the above-described reaction product mixture was fed from a reaction vessel (1) through a transfer pipe (6) with a flow rate of about 15 l/h into the continuous water flow circulating in the recirculation loop (8) at about 15-20 m$^3$/h. The combination of the reaction product mixture and water was subjected to high shear in the high shear device (4) and passed from there to the precipitation vessel (2) via an outlet conduit (5) of the high-shear device (4). After the total reaction product mixture was transferred into the precipitation vessel (2), the precipitation vessel was filled-up with additional 400 L of water while stirring with the central agitator (7) and recirculation of the precipitated suspension by use of the high-shear device (4).

Figure 5A:
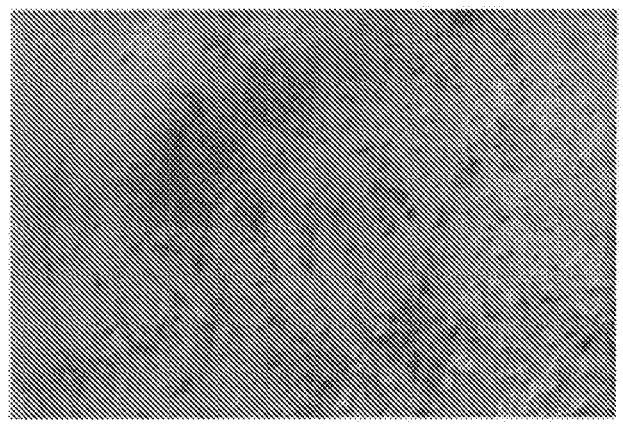
FIG. 5A illustrates precipitation of HPMCAS from a third reaction mixture as described in Example 3, obtained by reacting HPMC with succinic anhydride and acetic anhydride in the presence of glacial acetic acid and sodium acetate, by contacting the reaction mixture with water in a precipitation vessel according to the process of the invention as illustrated in FIG. 7A. The HPMCAS formed a finely dispersed precipitate in the precipitation vessel.
Figure 5B:
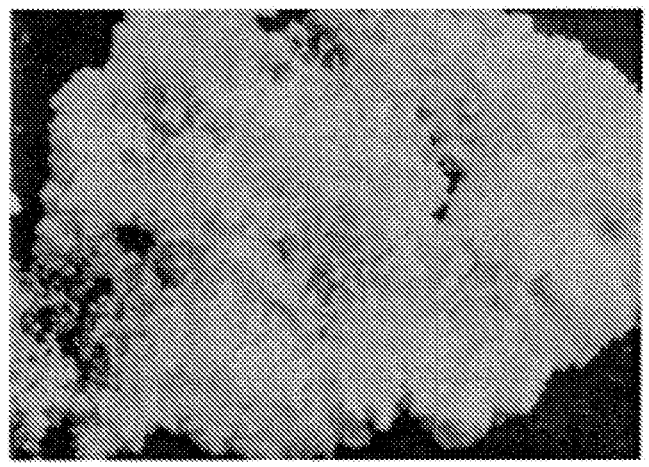
FIG. 5B illustrates HPMCAS after removal of the liquid phase from the finely dispersed precipitate illustrated in FIG. 5A.

FIG. 5A illustrates the resulting suspension and comprising the finely dispersed HPMCAS in the precipitation vessel (2). FIG. 5B illustrates the disperse character of the product after decanting the liquid phase of the suspension in the precipitation vessel (2).

After precipitation the suspension comprising the finely dispersed HPMCAS was removed from the precipitation vessel (2) and the precipitated product was separated from the suspension by washing and filtration of the precipitated product by use of about 10 m³ of water.

Figure 5C:
FIG. 5C illustrates white granular non-sticking HPMCAS obtained after separation and isolation of the product from the suspension, followed by washing and filtration.

After separation and isolation of the washed product from the suspension a white granular non-sticking HPMCAS filter cake was obtained as shown in FIG. 5C which shows a good flowability and could be dispersed in water as fine particles without the formation of tacky lumps. The HPMCAS was dried at 50-55° C. for 10 hours to obtain a non-tacky product of fine particle size.

Precipitation of HPMCAS According to a Comparative Process

After esterification as described above, an amount of water corresponding about twice the volume of the reaction product mixture was added to the hot reaction product mixture to allow the reaction product to be precipitated. During the addition of the water the content of the reactor was stirred by use of the above described MIG™ stirrer (outer blades diameter 120 mm) running at 150 rpm and a tip speed of 0.9 m/s. The resulting shear rate was 35 s⁻¹.

Figure 6A:
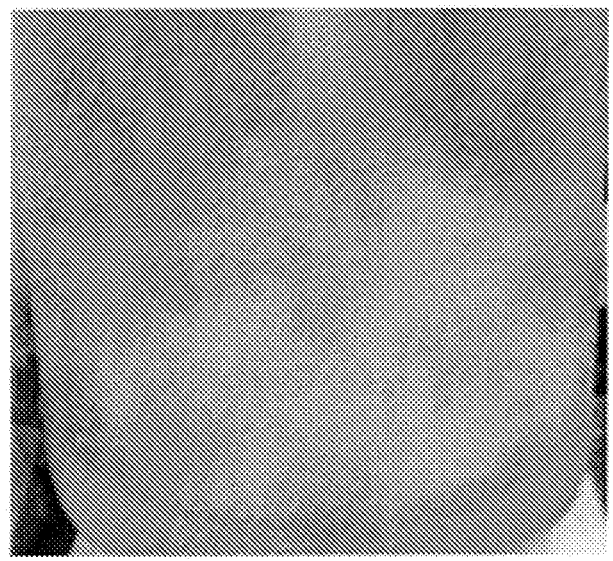
FIG. 6A illustrates precipitation of HPMCAS from the same reaction mixture as in Example 3 by contacting the reaction mixture with water according to a third comparative process applying a low shear rate. The HPMCAS precipitate formed sticky lumps.

The HPMCAS precipitate formed sticky lumps as shown in FIG. 6A.

Figure 6B:
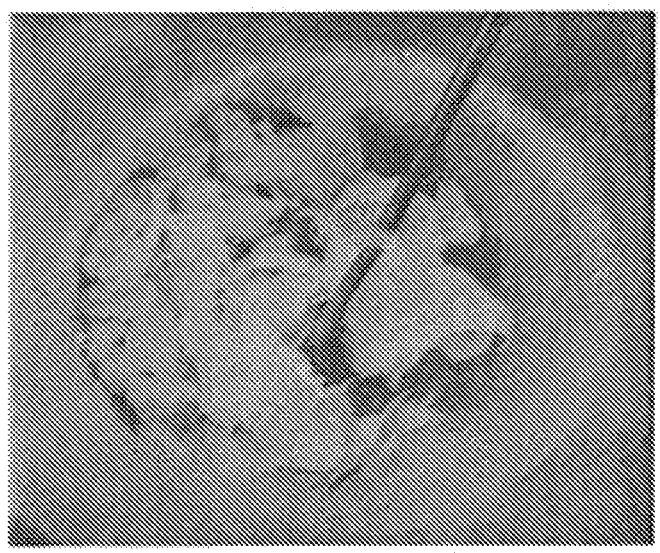
FIG. 6B illustrates the same HPMCAS as in FIG. 6A after washing with an additional amount of water and after separation from the liquor. The HPMCAS still formed sticky lumps.

After HPMCAS was removed from the liquor and washed with an additional amount of water corresponding to twice the original volume of the reaction product mixture, tacky chunks of product were obtained, as shown in FIG. 6B, which could not be easily dispersed in water. Drying at 50-55° C. did not change the tacky appearance.

The invention claimed is:

1. A process for precipitating hydroxypropyl methyl cellulose acetate succinate (HPMCAS) from a reaction product mixture obtained from a reaction of (a) a hydroxypropyl methyl cellulose with (b) acetic anhydride and succinic anhydride the presence of (c) an aliphatic carboxylic acid, wherein the process comprises the step of contacting the reaction product mixture having a temperature of 60-110° C. with water and subjecting the combination of water and the reaction product mixture to a shear rate of at least 800 s⁻¹ wherein the HPMCAS forms a finely dispersed precipitate, separating the dispersed HPMCAS from the remainder of the combination of water and reaction product mixture, washing the HPMCAS with water to obtain a granular, non-sticking HPMCAS and drying the washed HPMCAS to produce HPMCAS in the form of a powder.

2. The process of claim 1 wherein the reaction product mixture has been obtained from a reaction of (a) the hydroxypropyl methyl cellulose with (b) acetic anhydride and succinic anhydride in the presence of a combination of (c) an aliphatic carboxylic acid and (d) an alkali metal carboxylate.

3. The process of claim 1 wherein the combination of water and the reaction product mixture is subjected to a shear rate of at least 1500 s⁻¹.

4. The process of claim 3 wherein the combination of water and the reaction product mixture is subjected to a shear rate of at least 3000 s⁻¹.

5. The process of claim 3 wherein the combination of water and the reaction product mixture is subjected to a shear rate of at least 8000 s⁻¹.

6. The process of claim 5 wherein shearing is conducted in a shear device running at a tip speed of at least 8 m/s.

7. The process of claim 6 wherein the reaction product mixture is contacted with 12 to 50 weight parts of water per weight part of hydroxypropyl methyl cellulose.

8. The process of claim 1 wherein shearing is conducted in a shear device running at a tip speed of at least 4 m/s.

9. The process of claim 8 wherein shearing is conducted in a shear device running at a tip speed of at least 8 m/s.

10. The process of claim 1 wherein the reaction product mixture is contacted with 12 to 300 weight parts of water per weight part of hydroxypropyl methyl cellulose.

11. The process of claim 1 wherein the reaction product mixture is contacted with water in a weight ratio [water/reaction product mixture excluding water] of from 1.0/1.0 to 5.0/1.0.

12. The process of claim 1 wherein the reaction product mixture is contacted with water in a weight ratio [water/aliphatic carboxylic acid] of from 3/1 to 30/1.

13. A process of preparing a hydroxypropyl methyl cellulose acetate succinate in the form of a powder wherein (a) a hydroxypropyl methyl cellulose is reacted with (b) acetic anhydride and succinic anhydride in the presence of (c) an aliphatic carboxylic acid and the hydroxypropyl methyl cellulose acetate succinate is precipitated from the reaction product mixture according to the process of claim 1.

14. The process of claim 13 wherein a hydroxypropyl methyl cellulose acetate succinate is produced in the presence of (c) a combination of an aliphatic carboxylic acid and (d) an alkali metal carboxylate and wherein after the esterification reaction the hydroxypropyl methyl acetate succinate is precipitated from the reaction product mixture by contacting the reaction product mixture and water at a weight ratio [water/(total weight of (a) hydroxypropyl methyl cellulose, (b) acetic anhydride and succinic anhydride, (c) aliphatic carboxylic acid and (d) esterification catalyst)] of from [1.4/1.0] to [5.0/1.0].

15. The process of claim 1 wherein the product mixture is contacted with 12 to 400 weight parts of water per weight part of hydroxypropyl methyl cellulose.

* * * * *